(12) United States Patent
Fujii

(10) Patent No.: US 8,816,618 B2
(45) Date of Patent: Aug. 26, 2014

(54) ROTARY MACHINE CONTROL APPARATUS

(75) Inventor: Kiyoshi Fujii, Chita-gun (JP)

(73) Assignee: Denso Corporation, Kariya (JP)

(*) Notice: Subject to any disclaimer, the term of this patent is extended or adjusted under 35 U.S.C. 154(b) by 156 days.

(21) Appl. No.: 13/568,466

(22) Filed: Aug. 7, 2012

(65) Prior Publication Data

US 2013/0038256 A1    Feb. 14, 2013

(30) Foreign Application Priority Data

Aug. 8, 2011   (JP) ................................. 2011-173206

(51) Int. Cl.
*H02P 21/00*    (2006.01)

(52) U.S. Cl.
CPC ........ *H02P 21/0003* (2013.01); *H02P 21/0035* (2013.01)
USPC .................. 318/400.02; 318/400.01; 318/700

(58) Field of Classification Search
CPC .......................... H02P 21/0035; H02P 21/0003
USPC ................................ 318/400.02, 400.01, 700
See application file for complete search history.

(56) References Cited

U.S. PATENT DOCUMENTS

| | | | |
|---|---|---|---|
| 5,038,092 A * | 8/1991 | Asano et al. .................. | 318/811 |
| 5,798,628 A | 8/1998 | Fujita et al. | |
| 7,781,999 B2 * | 8/2010 | Amano ....................... | 318/400.3 |
| 7,952,309 B2 * | 5/2011 | Nishimura et al. ...... | 318/400.24 |
| 8,253,360 B2 * | 8/2012 | Schulz et al. ............ | 318/400.02 |
| 2008/0061727 A1 | 3/2008 | Tomigashi | |

FOREIGN PATENT DOCUMENTS

JP    2010-252432    11/2010

OTHER PUBLICATIONS

Fukumoto et al., "A Method for Calculating AC Currents from Sampled DC Current Data in a Three-Phase PWM Inverter", IEEJ Transactions on Industry Applications, vol. 127, No. 2, (2007), pp. 181-188.
Office Action (2 pages) dated Jul. 30, 2013, issued in corresponding Japanese Application No. 2011-173206 and English translation (2 pages).

* cited by examiner

Primary Examiner — David Luo
(74) Attorney, Agent, or Firm — Nixon & Vanderhye PC

(57) ABSTRACT

A current sensor detects a bus current flowing to an inverter. An estimation section uses actual currents id and id outputted from a d-q conversion section as initial values, estimates currents flowing in a motor/generator and calculates estimated currents ide and iqe. A UVW conversion section converts the estimated current ide and iqe to three phase currents. A selection section inputs, as currents flowing in each phase of the motor/generator, three out of outputs of the UVW conversion section and the bus current. The bus current is used as the current of one phase, if a voltage vector representing an operation state of the inverter is an effective voltage vector.

6 Claims, 7 Drawing Sheets

| VOLTAGE VECTOR | TURNED-ON SWITCH | | |
|---|---|---|---|
| | U | V | W |
| V0 | L | L | L |
| V1 | H | L | L |
| V2 | H | H | L |
| V3 | L | H | L |
| V4 | L | H | H |
| V5 | L | L | H |
| V6 | H | L | H |
| V7 | H | H | H |

ROTARY MACHINE CONTROL APPARATUS

CROSS REFERENCE TO RELATED APPLICATION

This application is based on and incorporates herein by reference Japanese patent application No. 2011-173206 filed on Aug. 8, 2011.

TECHNICAL FIELD

The present disclosure relates to a rotary machine control apparatus for controlling a control amount in at least one of current, torque or magnetic flux of a rotary machine by turning on and of switching devices of a DC-AC conversion circuit, which selectively connects terminals of the rotary machine to a positive side and a negative side of a DC power source.

BACKGROUND ART

As a conventional rotary machine control apparatus, JP 2010-252432A, for example, proposes model estimation control for operating an inverter. In this control, currents of a three-phase motor are estimated in correspondence to various operation states of the inverter and differences between the estimated currents and command currents are minimized. According to this control, since the inverter is operated to optimize a change of the current estimated based on the operation state of the inverter, it is possible to control the currents to properly follow the command value at transient operation time. The model estimation control is thus considered to be useful for a motor/generator control apparatus or the like in a vehicle, in which particularly high performance is required as a transient follow-up characteristic.

For estimating a current, a sensor is necessary to detect an initial current value. In case of a three-phase motor, two or more sensors are generally needed to detect at least currents flowing in two phases. This adds costs.

SUMMARY

It is therefore an object to provide an improved rotary machine control apparatus for controlling a control amount including at least one of current, torque and magnetic flux of a rotary machine by turning on and of switching devices of a DC-AC conversion circuit; which selectively connects terminals of the rotary machine to a positive side and a negative side of a DC power source.

According to one aspect, a rotary machine control apparatus provided for controlling a control amount including at least one of current, torque and magnetic flux of a rotary machine by turning on and off switching devices of a DC-AC conversion circuit, which selectively connects terminals of the rotary machine to a positive side and a negative side of a DC power source. The rotary machine control apparatus comprises an estimation section, a determination section, an operation section and an acquisition section. The estimation section sets provisionally an operation state of the DC-AC conversion circuit represented by a voltage vector determined by an on-off operation and estimating the control amount in correspondence to each provisionally set operation state. The determination section determines the operation state of the DC-AC conversion circuit based on an estimated control amount. The operation section operates the DC-AC conversion circuit to attain a determined operation state. The acquisition section acquires a detection value of a current flowing in an input terminal of the DC-AC conversion circuit. The estimation section uses, as an initial value for estimating the control amount, an acquired detection value of the current based on the operation state of the operation section.

BRIEF DESCRIPTION OF DRAWINGS

The above and other objects, features and advantages of a rotary machine control apparatus will become more apparent from the following detailed description made with reference to the accompanying drawings. In the drawings.

DETAILED DESCRIPTION OF EMBODIMENT

Figure 1:
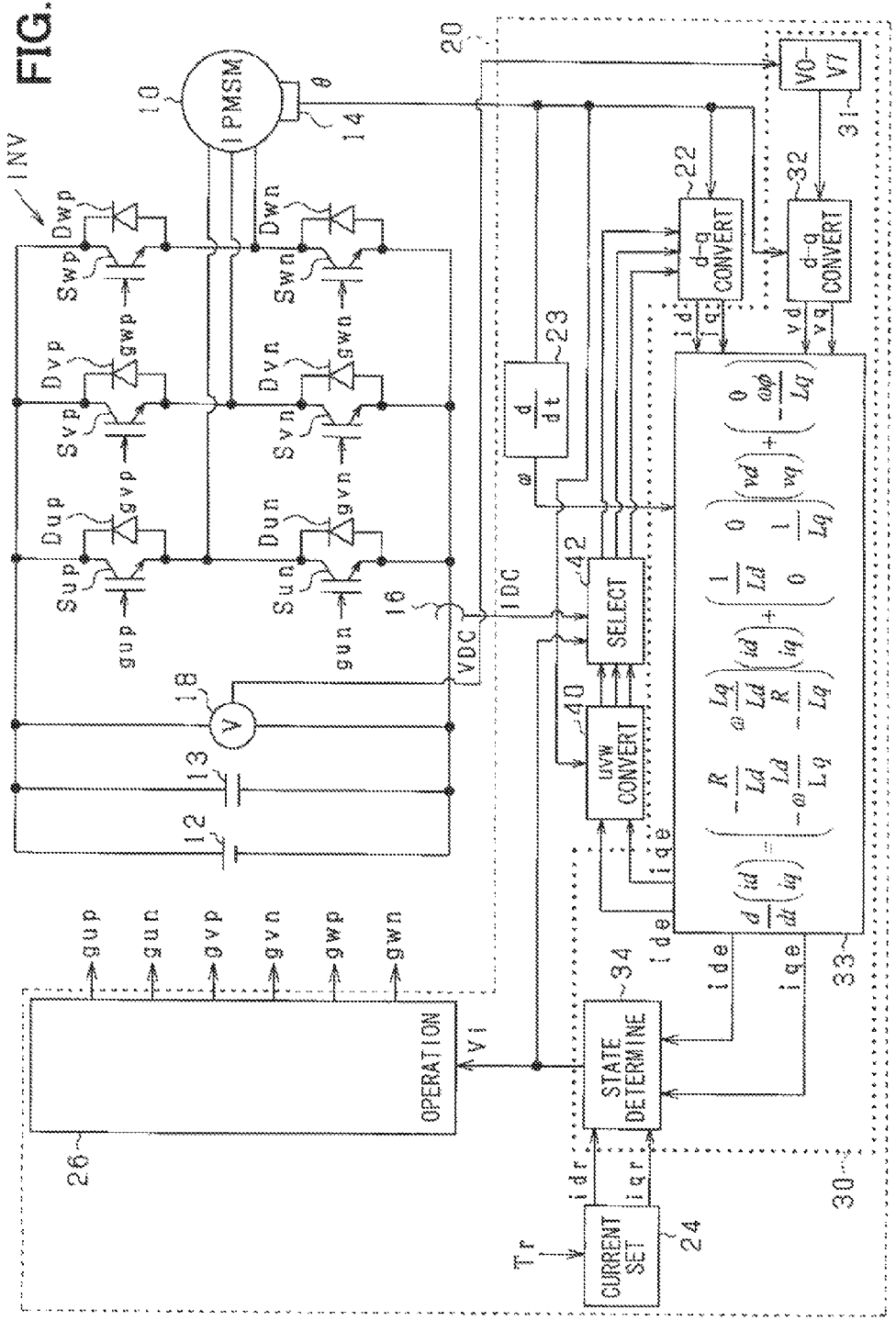
FIG. 1 is a system diagram showing a first embodiment of a rotary machine control apparatus.

A control apparatus for a rotary machine (rotary machine control apparatus) will be described with reference to various embodiments, in which the control apparatus is provided in a vehicle having a motor/generator as a main in-vehicle device as shown in the drawings.

First Embodiment

Referring to FIG. 1 showing an in-vehicle electric drive system, a motor/generator 10, which is a three-phase permanent magnet synchronous motor, is provided as a main in-vehicle device. The motor/generator 10 is a rotary machine. Specifically, the motor/generator 10 is an implanted permanent magnet synchronous motor (IPMSM).

The motor/generator 10 is connected to a high-voltage battery 12 and a capacitor 13 through an inverter INV, which is a DC-AC conversion circuit. The high-voltage battery 12 is a DC voltage source, which supplies a terminal voltage of more than 100 volts, for example. The inverter INV includes three sets of series-connected arms of switching devices designated generally as S*p and S*n (* being u, v or w indicating a phase of a motor). Junctions in the three arm sets are connected to a U-phase, a V-phase and a W-phase of the motor/generator 10, respectively. Each of the switching devices S*# (* being u, v or w; and # being p or n) is an insulated-gate bipolar transistor (IGBT). A diode D*# is connected to each of the switching devices in parallel and in reverse-biased relation.

Operation states of the motor/generator 10 and the inverter INV are detected by various sensors or detectors. For example, a rotation angle sensor 14 is provided to detect a rotation angle (electric angle θ) of the motor/generator 10. A current sensor 16 is provided in a negative bus of the inverter INV to detect a current (bus current IDC) flowing in an input terminal (negative-side input terminal) of the inverter INV. A voltage sensor 18 is provided to detect an input voltage (power source voltage VDC) of the inverter INV supplied from the battery 12.

Detection values outputted from theses sensors are acquired into a control apparatus 20 forming a low voltage system through an interface (not shown). The control apparatus 20 generates and outputs operation signals for operating the inverter INV based on the detection values of the sensors and detectors. The operation signals for operating switching devices S*# of the inverter INV are indicated as g*#.

The control apparatus 20 operates the inverter INV to control a for re generated by the motor/generator 10 to a required torque Tr. Specifically it operates the inverter INV so that currents flowing in the motor/generator 10 attain command currents for realizing the required torque Tr. The torque of the motor/generator 10 is a final control amount. However, the current flowing to the motor/generator 10 is controlled as a direct control amount, which is directly controlled, so that the current becomes equal to a command current. For controlling the current flowing to the motor/generator 10 to the command current, plural operation states of the inverter INV are set provisionally. For each provisional operation state, the current of the motor/generator 10 is estimated or predicted. The provisional operation state is evaluated based on the estimated current. Model estimation control is performed to select an operation state of highest evaluation as an actual operation state of the inverter INV.

Specifically, the bus current IDC detected by the current sensor 16 and other detected values are acquired to a d-q conversion section 22 through a selector 42. The conversion section 22 converts output values of the selector 42 to actual currents id and iq of a rotating coordinate system. The electric angle θ detected by the rotation angle sensor 14 is inputted to a speed calculation section 23, which calculates a rotation speed (electric angular velocity ω) of the motor/generator 10. A command current setting section 24 inputs the required torque Tr and outputs required currents idr and iqr determined on the d-q coordinate system. These currents are referred to as command currents required for attaining the required torque Tr. The command currents iqr, id the actual currents id, iq and the electric angle θ are inputted as input parameters to a model estimation control section 30. The model estimation control section 30 determines a voltage vector Vi, which determines the operation state of the inverter INV, based on the input parameters, and outputs it to an operation section 26. The operation section 26 generates the operation signals g*# based on the inputted voltage vector Vi and outputs it to the inverter INV.

Figures 2A, 2B:
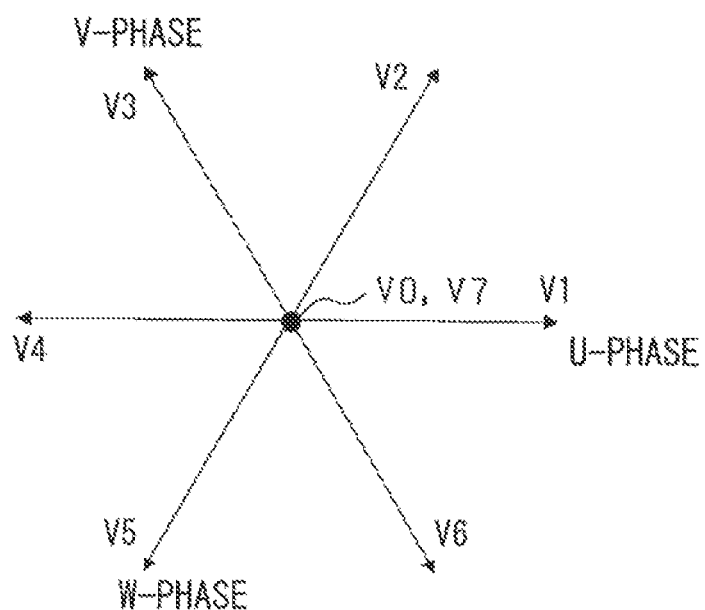
FIGS. 2A and 2B are a table and a diagram showing a voltage vector representing an operation state of an inverter.

The voltage vector expressing the operation state of the inverter INV is shown as eight voltage vectors in FIGS. 2A and 2B. For example, the voltage vector expressing the operation state, in which the low-side switching devices Sun, Svn and Swn (indicated as L in FIG. 2A) are turned on, is a voltage vector V0. The voltage vector expressing an operation state, in which the high-side switching devices Sup, Svp and Swp (indicated as H in FIG. 2A) are turned on, is a voltage vector V7. These voltage vectors V0 and V7 short-circuit all phases of the motor/generator 10 so that the voltage supplied from the inverter INV to the motor/generator 10 becomes zero (0). Thus, this is referred to as a zero-voltage vector. Remaining six voltage vectors V1 to V6 are determined based on operation patterns, in which both high-side arms and low-side arms include switching devices that are turned on. As shown in FIG. 2B, the voltage vectors V1, V3 and V5 correspond to the high sides of the U-phase, the V-phase and the W-phase, respectively.

The model estimation control section 30 is configured to execute processing described in detail next. The processing is shown in a functional block form. The operation states of the inverter INV are set by an operation state setting section 31.

Here, the operation states of the inverter INV are set by the voltage vectors V0 to V7 shown in FIGS. 2A and 2B. A d-q conversion section 32 d-q converts the voltage vector set by the operation state setting section 31 thereby to calculate the voltage vector Vdo=(vd, vq) of the d-q coordinate system. For this conversion, the voltage vectors V0 to V7 in the operation state setting section 31 may be expressed by, for example, setting VDC/2 for "H" and −VDC/2 for "L" in FIG. 2A. For example, the voltage vector V0 is expressed as (−VDC/2, −VDC/2, −VDC/2) for the U-phase, the V-phase, the W-phase, respectively. The voltage vector V1 is expressed as (VDC/2, −VDC/2, −VDC/2).

An estimation section 33 estimates a d-axis current id and a q-axis current iq for a state, which is set by the operation state setting section 31, based on the voltage vector (vd, vq), the actual currents id, iq and the electric angular velocity ω. Here, a next current, which will flow one step ahead, is estimated by solving voltage equations expressed as (c1) and (c2) with respect a differentiation term of current and discretizing the resulting equations (c3) and (c4).

$$vd = (R + pLd)id - \omega Lqiq \tag{c1}$$

$$vq = \omega Ldid + (R + pLq)iq + \omega \phi \tag{c2}$$

$$pid = -(R/Ld)id + \omega(Lq/Ld)iq + vd/Ld \tag{c3}$$

$$piq = -\omega(Ld/Lq)id - (Rd/Lq)iq + vq/Lq - \omega\phi/Lq \tag{c4}$$

In the equations (c1) and (c2), R is a resistance, p is a differentiation operator, Ld is a d-axis inductance, Lq is a q-axis inductance, and ϕ is an armature magnetic flux linkage constant.

The estimation of current is performed for each of the plural operation states provisionally set by operation state setting section 31.

The section 34 on the other hand inputs the estimated currents ide, iqe estimated by the estimation section 33 and the command currents idr, iqr, and determines the operation state of the inverter INV. The operation section 26 generates and outputs the operation signals g*# based on the operation states determined as described above.

Figure 3:
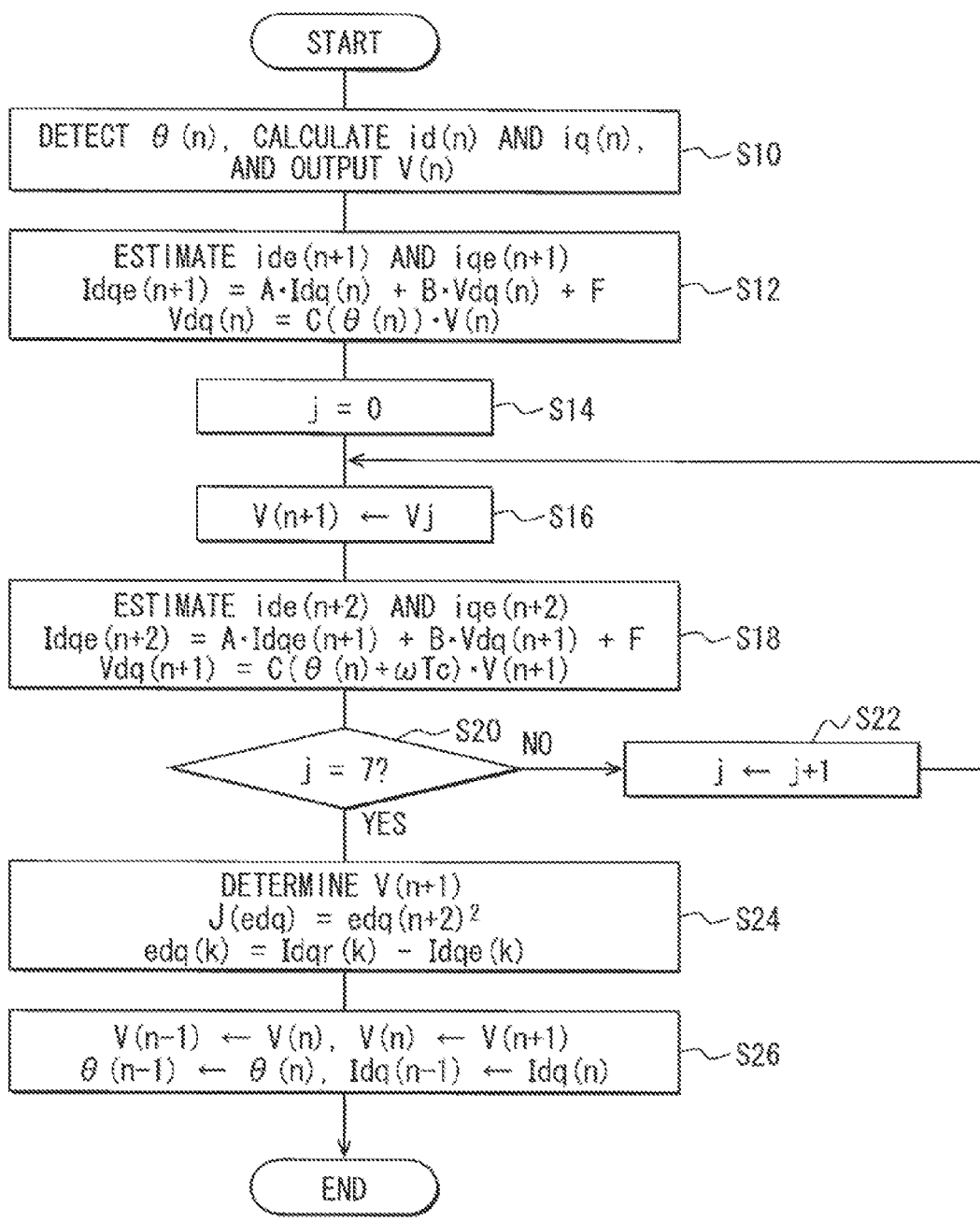
FIG. 3 is a flowchart showing model estimation processing executed in the first embodiment.

The model estimation control is executed as shown in FIG. 3. This processing is repeated at a predetermined interval (control cycle period Tc).

In this series of processing steps, first at step S10, the electric angle θ(n) is detected, the actual currents id(n) and iq(n) are calculated as described below, and the voltage vector V(n) determined in the preceding control cycle period is outputted. At the following step S12, the current (ide(n+1), iqe(n+1)) of a next control cycle (one control cycle ahead) is estimated by estimation. Thus, the current of one control cycle period ahead is estimated based on the voltage vector V(n) outputted at step S10. Specifically, the currents ide(n+1) and iqe(n+1) are calculated by discretizing the model expressed by the above-described equations (c3) and (c4) by using the forward difference method at a control cycle period Tc. Here, the actual currents id(n) and iq(n) detected at step S10 are used as initial values of the current, and the voltage vector V(n), which is d-q converted by the electric angle θ(n) detected at step S10, is used as the voltage vector on the d-q axes.

At the following steps S14 to S22, a current of two control cycle period ahead is estimated with respect to each case, in which plural voltage vectors in the next control cycle period are set. Specifically, at step S14, a number "j", which specifies a voltage vector is set to zero (0). At the following step S16, the voltage vector Vj is set as a voltage vector V(n+1) for the next control cycle period. At the following step S18, similarly to step S12, estimated currents ide(n+2) and iqe(n+2) are calculated. Here, the estimated currents ide(n+1) and iqe(n+1) calculated at step S12 are used as the initial value of the current. The voltage vector V(n+1), which is d-q converted by an angle corresponding to a sum of the electric angle θ(n) detected at step S10 and ωTc, used as the voltage vector on the d-q axes.

At the following step S20, it is checked whether the number "j" is 7. This step is executed to check whether estimations of currents have been completed with respect to each of the voltage vectors V0 to V7, which define the operation states of the inverter INV. If the check result at step S20 is negative, the number "j" is incremented at step S22, and step S16 is repeated. If the check result at step S20 is YES, step S24 is executed.

At step S24, the voltage vector V(n+1) in the next control cycle period is determined. Here, the voltage vector, which has the highest evaluation result by an evaluation function J, is determined to be a final voltage vector V(n+1). The evaluation function J, which increases an evaluation value as the evaluation decreases, is used. Specifically, the evaluation function J is calculated based on an inner (scalar) product value of the command current vector Idqr=(idr, iqr) and the estimated current vector Idqe=(ide, iqe). This is one method to indicate that the evaluation is lower as the calculated value is larger, because the difference in each component of the command current vector Idqr and the estimated current vector Idqe will be likely to become positive and negative.

Thus, the evaluation function J is configured so that the evaluation result becomes lower as the difference of each component between the command current vector Idqr and the estimated current vector Idqe becomes larger.

Before the check result at step S20 becomes affirmative, the estimated currents ide(n+2) and iqe(n+2) have already calculated with respect to each of the voltage vectors V0 to V7. Thus eight values of the evaluation functions J are calculated by using eight estimated currents ide(n+1) and iqe(N+2). At the following step S26, the voltage vectors V(n) and V(n+1) are set as voltage vectors V(n−1) and V(n) respectively. The electric angle θ(n) is set to θ(n−1). The actual currents id(n) and iq(n) are set as actual currents id(n−1) and iq(n−1), respectively. When step S26 is finished, the above-described series of processing is repeated.

It is only the current sensor 16 that is provided to detect the bus current IDC as the current of the motor/generator 10. The bus current IDC equals in absolute value the current of one phase of the motor/generator 10 in case that the voltage vector expressing the operation state of the inverter INV is an effective voltage vector. It is necessary to acquire current information about at two phases to determine the current flowing to the three-phase rotary machine. The number of detection values of the current detection sections is less than the number of detection values required to determine the current to the motor/generator 10. For this reason, the current flowing to the motor/generator 10 is determined based on the bus current IDC and the estimated currents ide and iqe.

That is, a UVW conversion section 40 shown in FIG. 1 converts the estimated currents ide and iqe to three phase estimated currents iue, ive and iwe. The selector 42 selectively outputs the bus current IDC and a part of the estimated currents iue, ive, iwe as the three phase current values to the d-q conversion section 22 based on the voltage vector Vi expressing the present operation state of the inverter INV. The d-q conversion section 22 converts the current values outputted from the selector 42 to the actual currents on the d-q axes as the processing of calculating the actual currents id(n) and iq(n) at step S10 in FIG. 3. Here, the output values of the selector 42 corresponding to the estimated currents iue, ive and iwe are calculated by three-phase conversion of the estimated currents ide(n+1) and iqe(n+1) of the preceding cycle period of processing of FIG. 3. These estimated currents ide(n+1) and iqe(n+1) are present current estimation values and not the estimated current values in the future any more, when used in the d-q conversion section 22. Thus, by synchronizing the detection timing of the bus current IDC to the execution of step S10 shown in FIG. 3 the phases of the bus current IDC and the estimated currents iue, ive and iwe are synchronized.

The actual currents id and iq outputted from the d-q conversion section 22 are calculated by using not only the bus current IDC but also the estimated currents ide and iqe. Thus these currents are not the detection values of the currents flowing to the motor/generator 10 but are mixture of one detection value and the estimate values.

Figure 4:
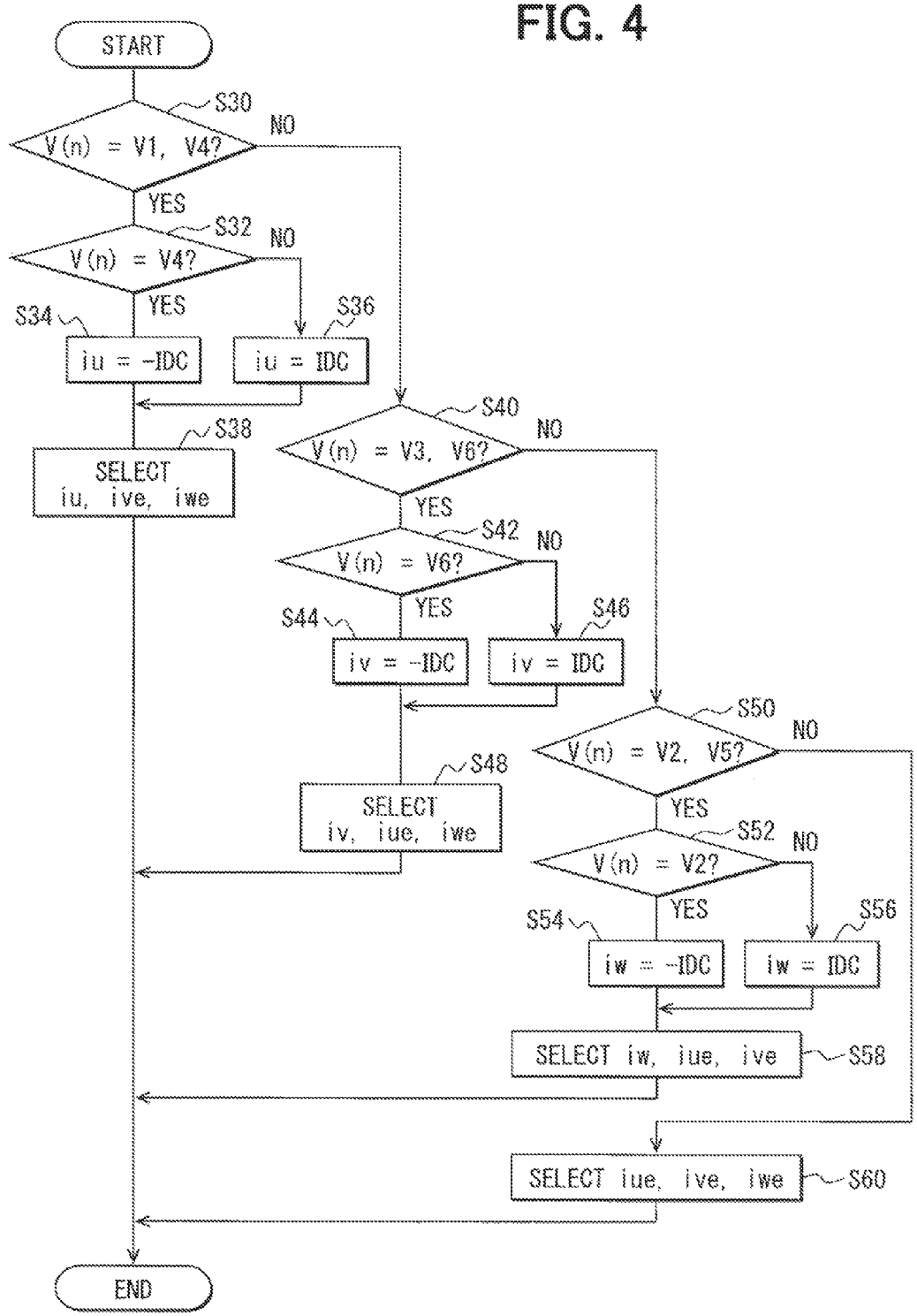
FIG. 4 is a flowchart showing selection processing executed in the first embodiment.

Selection processing executed by the selector 42 is shown in FIG. 4. This processing is synchronized with the processing shown in FIG. 3 and repeated in advance of the execution of step S10 in FIG. 3.

In this series of processing, it is first checked at step S30 whether the voltage vector V(n) outputted at step S10 executed subsequent to the series of processing is the voltage vector V1 or V4. This processing is for checking whether the absolute value of the bus current IDC equals the absolute value of the phase current of the U-phase. Since the switching devices Sup, Svn and Swn are turned on in case of the voltage vector V1, the bus current IDC equals the sum of the currents flowing in the V-phase lower arm and the W-phase lower arm. This current equals the current flowing in the U-phase upper arm. Since the switching devices Sun, Svp and Swp are turned on in case of the voltage vector V4, the bus current IDC equals the current flowing in the U-phase lower arm.

If the check result at step S30 is affirmative, it is checked at step S32 whether the voltage vector V(n) is the voltage vector V4. If the check result at step S32 is affirmative, the U-phase actual current iu is set to −IDC at step S34. If the check result at step S32 is negative, the U-phase actual current iu is set to IDC at step S36. This step is executed because the polarity of the phase current is determined to be positive when the current flows from the inverter INV to the motor/generator 10. When steps S34 and S36 are finished, the actual current iu and the estimated current ive and iwe are selected at step S38.

If the check result at step S30 is negative, it is checked at step S40 whether the voltage vector V(n) is the voltage vector V3 or V6. This processing is executed for checking whether the absolute value of the bus current IDC equals the absolute value of the V-phase current. If the check result at step S40 is affirmative, either IDC or −IDC is selected as the actual current iv at steps S42 to S48 in the similar manner as at steps S32 to S38.

If the check result at step S40 is negative, it is checked at step S50 whether the voltage vector V(n) is the voltage vector V2 or V5. This processing is executed for checking whether the absolute value of the bus current IDC equals the absolute value of the W-phase current. If the check result at step S50 is affirmative, either IDC or −IDC is selected as the actual current iw at steps S52 to S58 in the similar manner as at steps S32 to S38.

If the check result at step S50 is negative, the voltage vector V(n) is zero voltage vector. In this case, the estimated currents iue, ive and iwe are selected at step S60.

When the execution of step S38, S48, S58 or S60 is finished, this series of processing is terminated once. When the voltage vector is altered, the bus current IDC may not possibly become the phase current expected at step S38, S48 or S58 due to dead time at the time of outputting (altering) the voltage vector V(n). It is therefore preferred in practice to set the bus current IDC detected immediately before the voltage vector is altered to the actual currents iu, iv and iw selected at steps S38, S48 or S58. It may be executed before the detection of bus current IDC, which is immediately before alteration of the voltage vector, when step S38, S48 or S58 is executed. In this case, the processing at step S38, S48 or S58 determines handling of the bus current IDC, which will be detected soon.

The first embodiment provides the following advantage (1).

(1) In case that the voltage vector V(n) is the effective voltage vector, the bus current IDC is used as one of the three phase currents and the remaining two phase currents are calculated based on the estimated currents ide and iqe. Thus the current flowing to the motor/generator 10 is determined from only the current sensor 16 by using the estimated currents ide and iqe.

Second Embodiment

Figure 5:
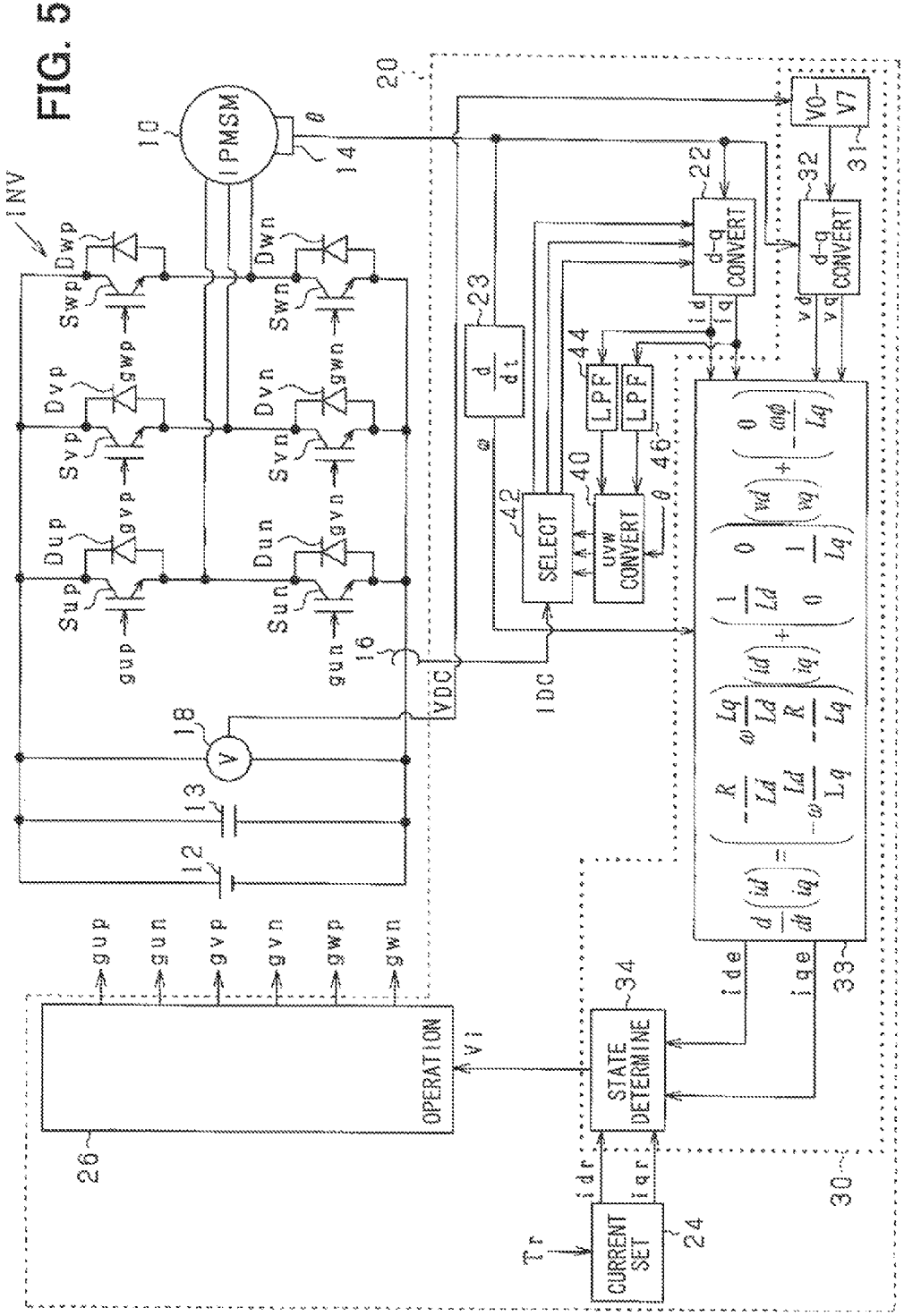
FIG. 5 is a system diagram showing a second embodiment of the rotary machine control apparatus.

Referring to FIG. 5, a second embodiment will be described primarily about the difference from the first embodiment. In FIG. 5, parts corresponding to those shown in FIG. 1 are designated by the same reference numerals for brevity.

In the second embodiment, the phase currents outputted from the selector 42 are determined based on the actual currents id and iq outputted from the d-q conversion section 22. That is, the actual current id of the d-axis in the d-q coordinate system is filtered by a low pass filter 44 and inputted to the UVW conversion section 40. The actual current iq of the q-axis is filtered by a low pass filter 46 and inputted to the UVW conversion section 40. The UVW conversion section 40 converts output values of the low pass filters 44 and 46 into three phase currents (currents of three phases). The selector 42 inputs the output value of the UVW conversion section 40 and the bus current IDC and selects the current value, which is inputted to the d-q conversion section 22 by similar processing shown in FIG. 4.

Since the motor/generator 10 is a synchronous machine, the actual currents id and iq are DC components. It is therefore possible to acquire the phase currents synchronized with the period of selection of the voltage vector V(n) by converting the actual currents id and iq to the three phase currents by using the latest electric angle θ(n). Since the phase currents are calculated by using the actual currents id and iq, from which high frequency noises are removed by the low pass filters 44 and 46, adverse influence of the noises and the like can be properly removed. As a result, in the normal operation time, in which at least the command currents idr and iqr do not change, the phase currents can be calculated with high precision.

The second embodiment described above provides the following advantages (2) and (3).

(2) In case that the voltage vector V(n) is the effective voltage vector, the bus current IDC is used as one of the three phase currents and the remaining two phase currents are calculated based on the actual currents id and iq. Thus the current flowing to the motor/generator 10 is determined by using only the current sensor 16.

(3) The present currents can be estimated with high resistivity to noises by using the low pass filters 44 and 46.

Third Embodiment

Figure 6:
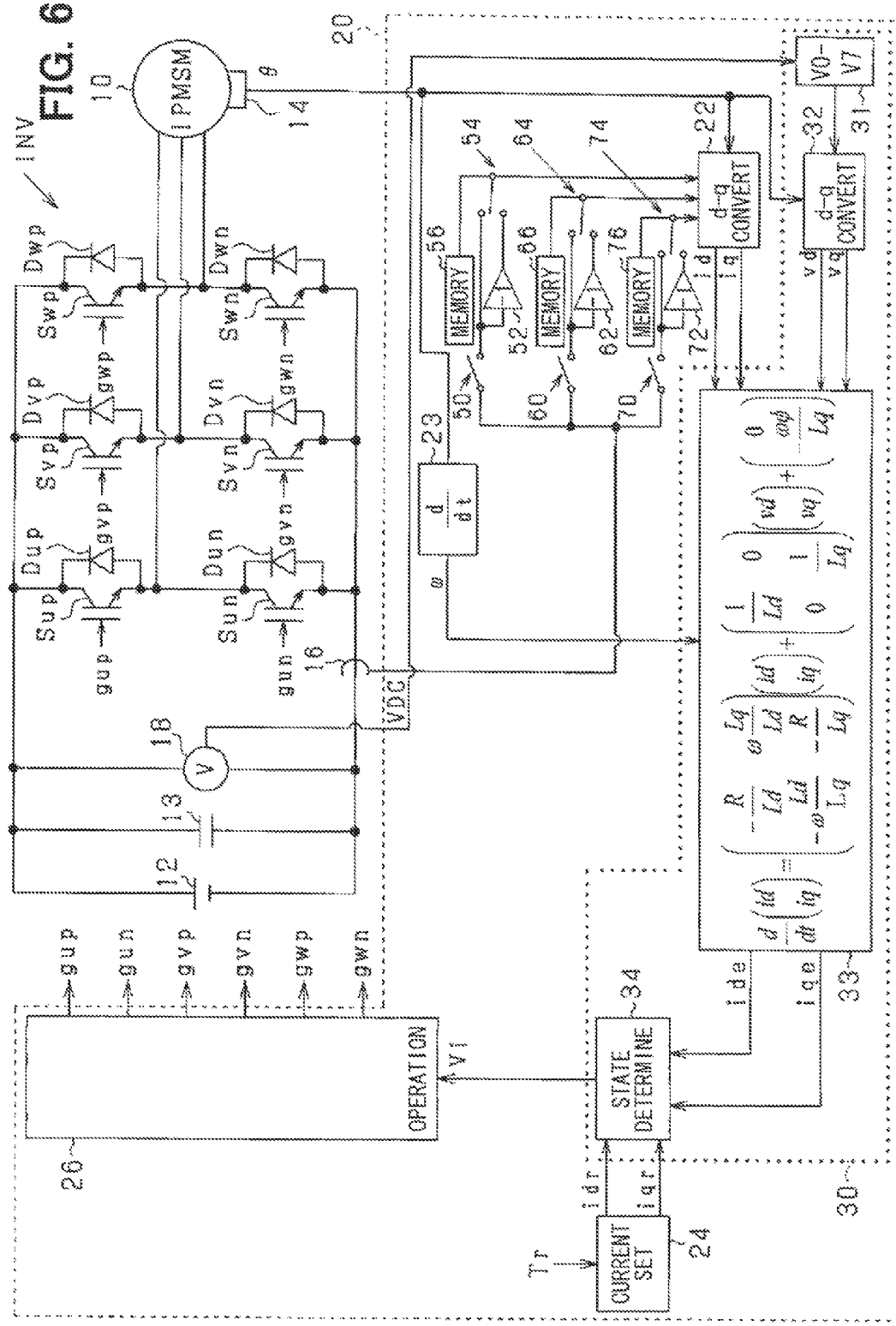
FIG. 6 is a system diagram showing a third embodiment of the rotary machine control apparatus.

Referring to FIG. 6, a third embodiment will be described primarily about the difference from the first embodiment. In FIG. 6, parts corresponding to those shown in FIG. 1 are designated by the same reference numerals for brevity.

In the third embodiment, the current, which does not correspond to the bus current IDC among the three phase currents flowing to the motor/generator 10 is determined by using a stored value of the bus current, which was detected immediately before the calculation.

The output value of the current sensor 16 is outputted to the d-q conversion section 22 as the phase current of the U-phase through a switch 50 and a selector 54. The selector 54 switches over outputting the output value itself of the current sensor 16 or a value, which is determined by multiplying the output value of the current sensor 16 by −1 by a multiplier 52. The output value of the selector 54 is stored in a memory 56.

Thus, when the bus current IDC correspond to the current of the U-phase, the switch 50 turns on and the selector 54 selects the current value, the polarity of which is determined, to the d-q conversion section 22. When the bus current does not correspond to the current of the U-phase, the switch 50 turns off and the selector 54 selects and inputs the stored value in the memory 56 to the d-q conversion section 22.

Similarly, the input value of the V-phase current supplied to the d-q conversion section 22 is generated by a switch 60, a multiplier 62, a selector 64 and a memory 66. The input value of the W-phase current supplied to the d-q conversion section 22 is generated by a switch 70, a multiplier 72, a selector 74 and a memory 74.

Fourth Embodiment

Figure 7:
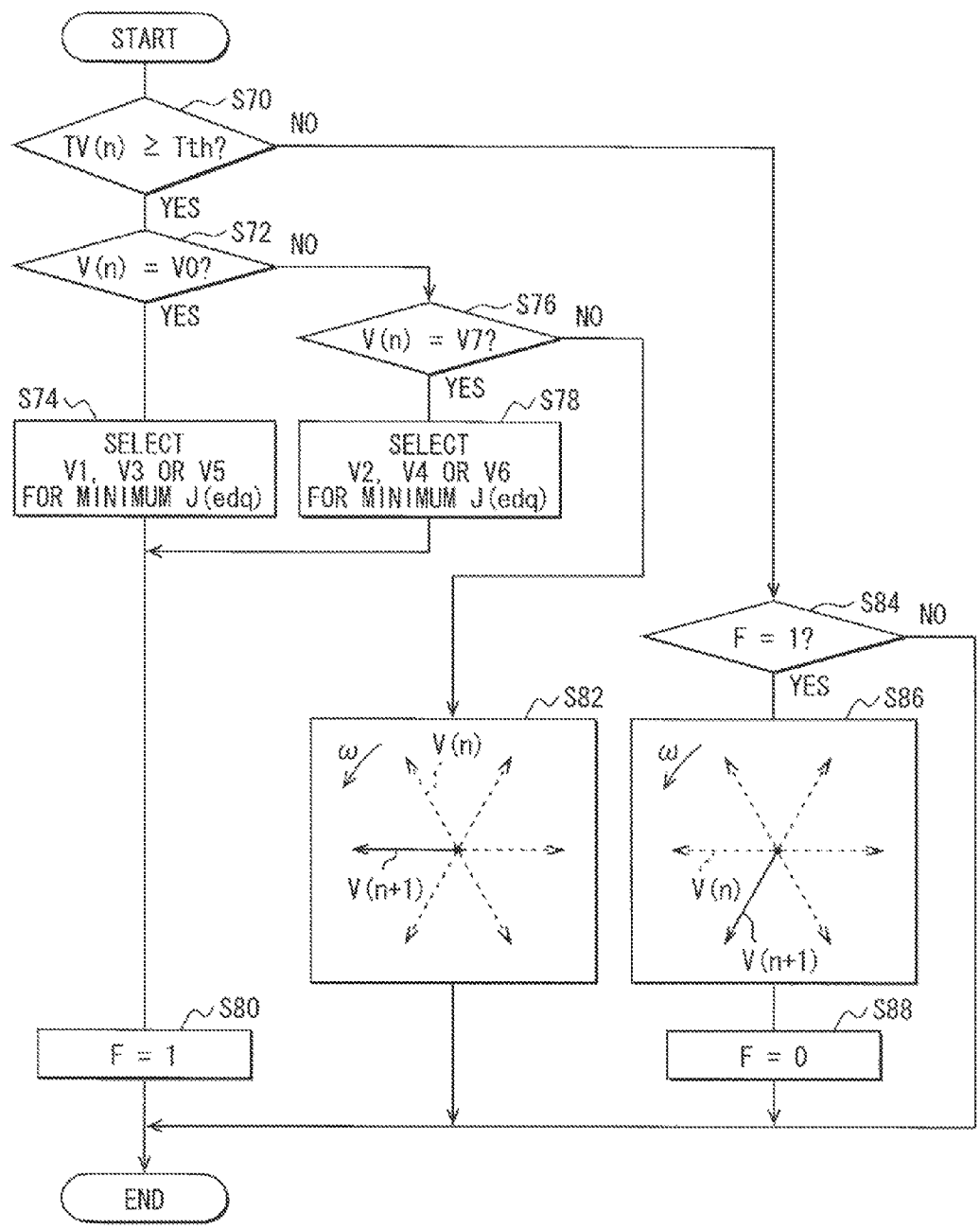
FIG. 7 is a flowchart showing voltage vector alteration processing executed in a fourth embodiment of the rotary machine control apparatus.

Referring to FIG. 7, a fourth embodiment will be described primarily about the difference from the first embodiment.

In the fourth embodiment, the voltage vector is forcibly altered when the voltage vector expressing the operation state of the inverter INV is fixed to a specified voltage vector for a long period of time, that is, when the voltage vector remains the same for a long period. This alteration is made from the following two reasons.

First, when the zero voltage vector continues, the bus current IDC does not correspond to any one of the phase currents of the motor/generator 10. It is thus likely that the actual currents id and iq inputted from the d-q conversion section 22 to the estimation section 33 deviate from the actual current flowing in the motor/generator 10. Second, when the specified voltage vector continues, a change in a rate of contribution of the bus current IDC to the actual currents id and iq if the electric angular velocity ω is small. As a result, the accuracy of the value inputted to the d-c conversion section 22 is likely to become low.

Steps of forcible alteration processing according to the fourth embodiment are shown in FIG. 7. This processing repeated at every interval of the processing shown in FIG. 3.

In this series of processing, at step S70, it is checked whether the voltage vector V(n) at this time has not changed from a previous time for more than a threshold time period Tth, that is, a continuation period TV(n) is equal to or longer than the threshold time period Tth. The threshold time period Tth is set, with respect to the period in which the voltage vector remains fixed, to be less than a minimum time period by which controllability is lowered to be less than an allowable range is estimated due to lowering of the accuracy of the current inputted to the d-g conversion section 22.

At step S72, it is checked whether the voltage vector V(n) is the voltage vector V0. If the voltage vector is V0, a voltage vector, which minimizes the evaluation function J, is selected among the voltage vectors V1, V3 and V5. This processing corresponds to step S24 in the processing of FIG. 3. Here, the voltage vector is limited to V1, V3 or V5 because the number of phases switched over at the time of alteration from the voltage vector V0 to the voltage vector V1, V3 or V5 is one (1). If the check result at S72 is negative, it is checked at step S76 whether the voltage vector V(n) is the voltage vector V7. If the voltage vector is V7, a voltage vector, which minimizes the evaluation function J, is selected among the voltage vectors V2, V4 and V6. This processing corresponds to step S24 in the processing of FIG. 3. Here, the voltage vector is limited to V2, V4 or V6 because the number of phases switched over at the time of alteration from the voltage vector V7 to the voltage vector V2, V4 or V6 is one (1).

When execution of steps S74 or S78 is finished, a flag is set to "1," which indicates a switching time from the zero voltage vector.

If the check result at step S76 is negative, the next voltage vector V(n+1) is assumed to be adjacent relative to the voltage vector V(n) of this time at step S82.

If the check result at step S70 is negative, it is checked at step S84 whether the flag F is "1." In case of the flag F "1," the voltage vector V(n+1) is assumed to be adjacent relative to the voltage vector V(n) of this time at step S86. This processing is provided for improving reliability of input values speedily in view of the fact that the input values to the d-q conversion section 22 is altered by the latest bus current IDC over the period, in which the zero voltage vector is continuously fixed. When the execution of step is completed, the flag F is set to "0" at step S88.

The above-described series of processing is finished once when the check result at step S84 is negative or the execution of steps S80, S82 and S88 are finished.

Other Embodiment

The above-described embodiments may be implemented with the following modifications.

<Forced Alteration>

In the fourth embodiment shown in FIG. 7, the operation state is forcibly altered even in the case that the operation state represented by the specified effective voltage vector is continued. It is however possible to alter the operation state forcibly only when the zero voltage vector continues. It is not always necessary to after the vector further altered to the adjacent vector after forcibly altering the effective voltage vector, when the zero voltage vector continues. It is also possible to alter the vector to another effective voltage vector, which is not adjacent. It is however preferred to set another effective voltage vector so that it does not become parallel to the previous effective voltage vector.

The adjacent voltage vector is not limited to that in the direction of rotation but may be a voltage vector, which is opposite to the direction of rotation. The forcible alteration of the effective voltage vector is not limited to the one, which minimizes the evaluation function J.

<Acquisition of Current Information Insufficient in Bus Current>

In the second embodiment, current information, with cannot be acquired from the bus current IDC, is acquired by converting the output signals of the low pass filters 44 and 46 to the three-dimensional coordinate system. However, the previous currents id and iq may be used without low pass filters 44 and 46.

<Estimation Section>

Estimation is not limited to the control amount only, which is generated by the next voltage vector V(n+1). For example, the control amounts of the operation of the inverter INV may be sequentially estimated up to an update time point which is ahead of several control cycle periods.

<Determination Section>

For example, it is possible in the first embodiment to use, as a parameter for evaluation object of degree of deviation, a weighted average value of two values. One is an absolute value of a difference between the estimated current ide(n+2) and the command current idr(n+2). The other is an absolute value of a difference between the estimated current iqe(n+2) and the command current iqr(n+2). That is, quantification is necessary by a parameter, which has a positive or a negative correlation between the degree of deviation and the evaluation thereby to quantify that the evaluation becomes lower as the degree of deviation increases.

The selection is not limited to the most highly evaluated one among the voltage vectors V0 to V7. It may be limited to one vector having the highest evaluation result among the voltage vectors, the number of terminals of which for changing the switching states is equal to 1 or less. In case of this setting, the number of terminals for changing the switching state becomes continuously 1 or less even when the processing (FIG. 7) is executed. Therefore, a withstand voltage required for each switching device S*# to have can be reduced.

<Control Amount>

The control amount, which is used as a control amount for determining the operation of the inverter INV, is not limited to the current. The control amount is the evaluation target with respect to the degree of deviation from the command value. The control amount may be torque and magnetic flux. Alternatively, the control amount may be torque only or magnetic flux only. Even in these cases, it is effective to use the bus current IDC in the manner described in the foregoing embodiments as far as the current is used to estimate the torque or the magnetic flux.

In the above-described embodiments, the ultimate control amount for the rotary machine (finally desired required control amount whether it is the estimated target) is set to torque. However, without being limited to this, the control amount may be set to a rotation speed or the like.

<Rotary Machine>

The rotary machine is not limited to the three-phase rotary machine but may be a rotary machine of four or more phases like a five-phase rotary machine and the like.

In the above-described embodiments, the motor/generator is assumed to have a star-connected stator winding. It is however possible that the stator winding is delta-connected. In this modification, the terminals of the rotary machine do not agree.

The rotary machine is not limited to the magnet synchronous machine having built-in magnets, but may be an arbitrary synchronous machine such as a surface magnet synchronous machine, a field coil synchronous motor or the like. It is further not limited to the synchronous machine, but may be an induction rotary machine such as an induction motor.

The rotary machine is not limited to a machine, which is used as main machine in a vehicle.

<DC-AC Conversion Circuit>

The switching devices are not limited to IGBTs, but may be field-effect transistors such as MOSFET field effect transistors.

What is claimed is:

1. A rotary machine control apparatus for controlling a control amount including at least one of current, torque and magnetic flux of a rotary machine by turning on and off switching devices of a DC-AC conversion circuit, which selectively connects terminals of the rotary machine to a positive side and a negative side of a DC power source, the rotary machine control apparatus comprising:

an estimation section for setting provisionally an operation state of the DC-AC conversion circuit represented by a voltage vector determined by an on-off operation and estimating the control amount in correspondence to each provisionally set operation state;

a determination section for determining the operation state of the DC-AC conversion circuit based on an estimated control amount;

an operation section for operating the DC-AC conversion circuit to attain a determined operation state; and an acquisition section for acquiring a detection value of a current flowing in an input terminal of the DC-AC conversion circuit, wherein the estimation section uses, as an initial value for estimating the control amount, an acquired detection value of the current based on the operation state of the operation section;

the DC-AC conversion circuit applies output voltages to three terminals of the rotary machine; and the estimation section uses a detection value of the current as a current flowing in either one of the three terminals of the rotary machine, when the voltage vector representing the operation state of the operation section is an effective voltage vector.

2. The rotary machine control apparatus according to claim 1, wherein:

the estimation section includes an estimation processing section, which executes estimation processing for estimating the current of each terminal of the rotary machine; and when the voltage vector representing the operation state of the operation section is the effective voltage vector, the estimation processing section sets the detection value of the current as the initial value of a current of each terminal with respect to either one of the three terminals of the rotary machine, and sets the detection value of the current as a current previously estimated by the estimation processing with respect to at least one remaining terminal of the three terminals.

3. The rotary machine control apparatus according to claim 1, wherein:

the estimation section includes a conversion section for converting the current flowing in each terminal of the rotary machine to currents on a d-q plane and using converted currents as the initial value; and when the voltage vector representing the operation state of the operation section is the effective voltage vector, the conversion section sets the detection value of the current as the current flowing in either one of the three terminals of the rotary machine, and sets a previous value of the current on the d-q axis, which is subjected to three-dimensional coordinate conversion, as a current flowing in at least one of remaining terminals of the three terminals.

4. The rotary machine control apparatus according to claim 3, wherein:

the current on the d-q axis is low-pass filtered before the three-dimensional coordinate conversion.

5. The rotary machine control apparatus according to claim 1, further comprising:

an alteration section for forcibly altering the operation state to an operation state, which is different from a present operation state and expressed by the effective voltage vector, on condition that the operation state performed by the operation section remains unchanged for more than a predetermined period.

6. The rotary machine control apparatus according to claim 5, wherein:

when the operation state remaining unchanged for more than the predetermined period is expressed by a zero voltage vector, the alteration section further alter the operation state to an operation state, which is expressed by another effective voltage vector not parallel to the effective voltage vector after forcibly altering to the operation state expressed by the effective voltage vector.

* * * * *